United States Patent
Mendez De La Cuesta

(10) Patent No.: US 9,022,048 B2
(45) Date of Patent: May 5, 2015

(54) DEVICE FOR CLEANING PHOTOVOLTAIC PANELS AND SOLAR THERMAL PANELS

(76) Inventor: Rafael Ma Mendez De La Cuesta, Madrid (ES)

( * ) Notice: Subject to any disclaimer, the term of this patent is extended or adjusted under 35 U.S.C. 154(b) by 986 days.

(21) Appl. No.: 13/140,870

(22) PCT Filed: Dec. 18, 2009

(86) PCT No.: PCT/ES2009/070607
§ 371 (c)(1),
(2), (4) Date: Jul. 27, 2011

(87) PCT Pub. No.: WO2010/072877
PCT Pub. Date: Jul. 1, 2010

(65) Prior Publication Data
US 2011/0271989 A1    Nov. 10, 2011

(30) Foreign Application Priority Data
Dec. 23, 2008  (ES) .................................. 200803664

(51) Int. Cl.
| | |
|---|---|
| *B08B 3/00* | (2006.01) |
| *F24J 2/46* | (2006.01) |
| *B08B 3/02* | (2006.01) |
| *H01L 31/042* | (2014.01) |
| *F24J 2/40* | (2006.01) |

(52) U.S. Cl.
CPC ................. *F24J 2/461* (2013.01); *B08B 3/024* (2013.01); *H01L 31/042* (2013.01); *Y02E 10/40* (2013.01); *Y02E 10/50* (2013.01); *F24J 2/40* (2013.01)

(58) Field of Classification Search
CPC .......... F24J 2/461; Y02E 10/40; Y02E 10/47; B08B 3/024; B08B 1/04
USPC ......... 134/198, 34, 15, 37, 186, 199, 172, 32, 134/42; 15/50.1, 21.1, 320, 340.1, 368; 239/161, 164, 172, 130, 137, 146, 163, 239/550, 722, 73
See application file for complete search history.

(56) References Cited

U.S. PATENT DOCUMENTS

| | | |
|---|---|---|
| 3,337,071 A | 8/1967 | Clark |
| 3,982,715 A | 9/1976 | Lindgren et al. |
| 4,423,469 A | 12/1983 | Zerlaut et al. |

FOREIGN PATENT DOCUMENTS

| | | | |
|---|---|---|---|
| DE | 20 2008 007 802 | 9/2008 | |
| EP | 874086 A1 * | 10/1998 | ................ E01H 1/00 |
| ES | 2 267 393 | 3/2007 | |
| FR | 2584747 A1 * | 1/1987 | ................ E01H 1/00 |
| IT | EP 0668400 * | 8/1995 | ................ E01H 1/00 |

OTHER PUBLICATIONS

Dupourque et al., "Vehicle for cleaning traffic routes, particularly walls of tunnels, underground passages and the like", Jul. 1985, FR 2584747—Machine Translation.*

* cited by examiner

*Primary Examiner* — Michael Kornakov
*Assistant Examiner* — Thomas Bucci
(74) *Attorney, Agent, or Firm* — Michael J. Striker

(57) ABSTRACT

Device for cleaning solar modules, of both the photovoltaic and solar thermal type, by projection of a cleaning liquid onto the surface of said modules in the form of spray, is described. The device is of the towed type, for mounting on a tractor vehicle or similar, and is implemented based on an articulated unit which comprises a coupled parallelogram structure, having the possibility of pivoting around a support structure solidarily joined to the carrier vehicle, joined by the opposite end to a telescopic arm which articulately includes a projection bar on its distal end, with variable positioning, integrating a multiplicity of nozzles for projecting cleaning liquid. The projection bar includes mechanical sensors for positioning thereof on the surface. The different movements are carried out in a controlled manner by actuation of hydraulic cylinders and the articulated joint between the projection bar and the telescopic bar includes a means for adjusting the maximum inclination angle of the projection bar.

9 Claims, 2 Drawing Sheets

DEVICE FOR CLEANING PHOTOVOLTAIC PANELS AND SOLAR THERMAL PANELS

CROSS-REFERENCE TO A RELATED APPLICATION

The invention described and claimed hereinbelow is also described in Spanish patent Application P200803664 filed on Dec. 23, 2008. This Spanish Patent Application, whose subject matter is incorporated here by reference, provides the basis for a claim of priority of the invention under 35 U.S.C. 119 (a)-(d).

OBJECT OF THE INVENTION

The present invention relates to a device for cleaning photovoltaic panels that can also serve for cleaning solar thermal panels, which provides essential characteristics of novelty and significant advantages compared to known means used for the same purpose in the current state of the art.

More specifically, the invention proposes the development of a device intended and designed for installation on movement means, specifically on a tractor vehicle or similar, having a structure based on an articulated arm which may be positioned at will on the photovoltaic modules of a power generating facility of this type or on the solar thermal panels of a thermal power plant, the free end of which is equipped with a projection bar having a multiplicity of spray nozzles for projecting cleaning liquid onto the surface of the modules, said bar being susceptible of adopting variable inclinations within a predetermined range of angular values, for the purpose of adapting to the inclination angles of both the photovoltaic modules and solar thermal panels of stationary installations and to the variable inclination angles of solar tracking modules. The projection bar includes mechanical sensors destined for avoiding unwanted contact between said bar and the panel surfaces.

The field of application of the invention is comprised within the industrial sector dedicated to the manufacture of auxiliary cleaning and maintenance equipment, particularly those designed and intended for use thereof in field operations.

BACKGROUND AND SUMMARY OF THE INVENTION

The vast proliferation of facilities destined for generating electrical energy by transformation of so-called renewable energies. The considerable increase in costs associated with the production of fossil fuels, together with the exhaustion of this type of reserve and the drawbacks associated with their use, including the special consideration that must be given to the global warming effect, has led to an ever-increasing dedication of resources to the installation of equipment for leveraging energies from naturally occurring sources, mainly solar energy, solar thermal energy and wind energy. Therefore, in the specific case of solar energy, it is becoming increasingly frequent to find a number of growing extensions of land surfaces occupied by solar modules, composed of a series of panels destined for transforming the solar radiation incident thereupon into electrical energy susceptible of being both leveraged in situ and conditioned and adapted for injection into the power grid and consumption in distant geographical locations.

In relation to a photovoltaic facility, each of the solar modules consists of a number of panels permanently mounted onto a structure that maintains and supports them. These modules, normally ordered in rows and columns in such a manner as to keep a minimum predetermined distance between adjacent modules, may be static, in such a manner that they are oriented in a more favourable manner so as to receive the greatest possible amount of radiation during the sunlight hours of the area where they are installed, for which purpose they have a fixed inclination angle which logically varies in accordance with the coordinates of the area where they are installed, or may have certain mobility which allows the progressive orientation thereof automatically in accordance with the movement of the sun throughout the day, always seeking to maintain the maximum possible perpendicularity to the sun's rays in order to ensure that solar energy is leveraged to a maximum. However, in all cases there are external phenomena that can negatively affect photovoltaic module efficiency, such as a layer of dirt on the surface thereof derived from environmental dust or rain, the accumulation of which creates opacity and hampers and reduces the passage of solar radiation towards the photovoltaic cells of each panel, with the ensuing decrease in the amount of energy produced and loss of efficiency of the installation. Therefore, adequate cleaning of the module surfaces to remove said dirt and maintain these in the best possible operating conditions becomes necessary.

Taking into account the needs of the current art, briefly outlined above, the main objective of the present invention is the development of a device that will enable the aforementioned cleaning operations to be carried out on the surfaces of the photovoltaic modules of a power generating facility, automatically and in a manner susceptible of being applied to the different types of existing facilities (i.e. plants with stationary modules or plants with tracking modules), aimed at guaranteeing better exploitation of the solar radiation incident thereupon and consequently maintaining overall efficiency at more appropriate values. This objective has been fully achieved using the device described hereunder, the main characteristics of which have been included in the characterising portion of claim 1 attached hereto.

In essence, the device has been materialised in the form of an articulated arm, adapted for mounting on a tractor vehicle, for example a tractor vehicle, for movement throughout the generation plant between the adjacent modules of each line or row. The device is joined to the tractor vehicle by means of a support structure that holds up an articulated parallelogram structure which articulately includes a part for closing said parallelogram on its opposing element, from one end of which an arm projects bearing a projection bar of variable length, depending on the surface to be cleaned, on its free end equipped with a multiplicity of nozzles separated at a variable distance, according to overlap percentage, water consumption, cleaning fluid pressure and the distance between the surface to be cleaned and the nozzle and, naturally, the characteristics of the nozzle itself. The cleaning liquid is projected from said nozzles in the form of a spray (water or a mixture of water and other cleaning and maintenance components), the liquid of which is impelled from a container tank incorporated in the tractor vehicle with the help of a pump. The arm is of the telescopic type, actuated by means of a hydraulic cylinder, while the joint between the projection bar and the arm of the device is, likewise, an articulated joint, in such a manner that the bar can be positioned in accordance with the needs of each particular case, adopting multiple relative positions in relation to its supporting arm. The device includes other hydraulic cylinders which are in charge of moving the parallelogram in accordance with the correct positioning that must be adopted by the arm. Finally, the projection bar includes position sensors, preferably mechanical or electromechanical sensors which prevent the physical contact between said bar and the surface of the panels of each module during the cleaning operations.

BRIEF DESCRIPTION OF THE DRAWINGS

These and other characteristics and advantages of the invention shall be clearly expounded in the following description of a preferred example of embodiment thereof, provided only in an illustrative and non-limiting manner, making reference to the accompanying drawings, wherein.

DESCRIPTION OF A PREFERRED FORM OF EMBODIMENT

Figure 1:
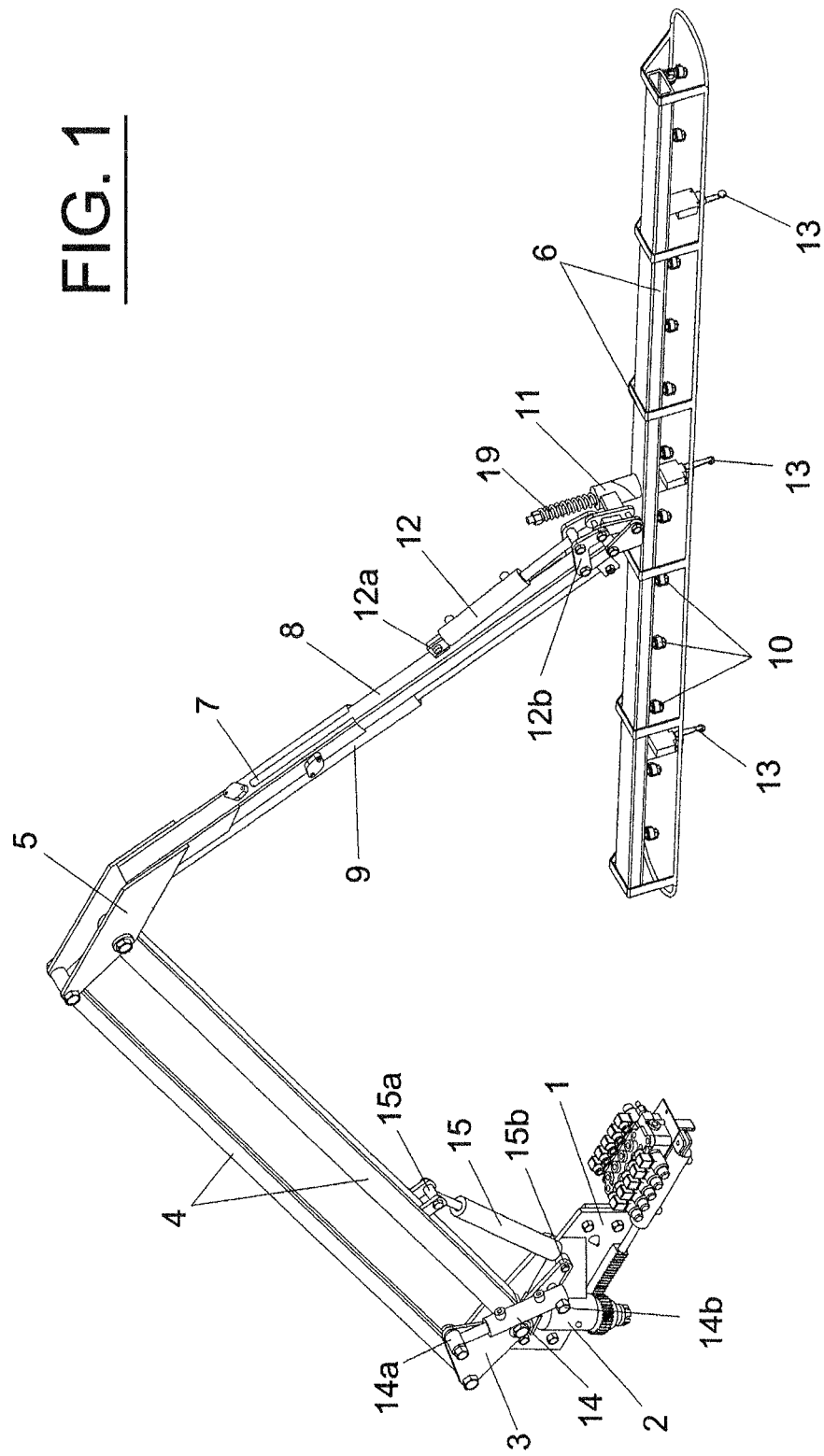
FIG. 1 shows a schematic perspective view of a device for cleaning solar modules implemented in accordance with the invention.

As mentioned in the foregoing section, a detailed description of the device for cleaning photovoltaic and solar thermal panel modules proposed by the invention is provided hereunder with the help of the attached drawings, wherein different portions of the device appear indicated by means of numerical references for the purpose of better identification thereof. Therefore, in accordance with FIG. 1, it can be observed that the device consists essentially of an articulated unit, held up by a support and stress transmission structure built as of a plate 1 for fixation to the tractor vehicle (not represented), whereto a vertical part 2 is solidarily joined which provides a cylindrical housing shaped and dimensioned for receiving, with the possibility of rotation, a shaft solidarily joined to the first closing part 3 of the lower end of a parallelogram structure, the shaft of which includes a pinion 16 that engages with a portion of the horizontally movable rack 17, the end of which is solidarily joined to the rod of a hydraulic cylinder 18. The parallelogram structure erected as of the aforementioned lower part 3 comprises two elongated bars 4 of predetermined length, articulated with said lower part 3, which at the opposite end close by means of a second upper part 5, whereto they are also joined in an articulated manner, and the structure of the second part 5 thereof is based on two parallel plates, separated by a certain distance, with a section projected from the point of articulation with one of the bars 4 of the parallelogram in order to give rise to a housing space wherein the end of a telescopic arm is inserted and fixed, bearing a projection bar 6 on its free end being generally elongated in shape and having a predetermined length chosen in accordance with the usual dimensions of photovoltaic and/or solar thermal panel modules, said projection bar 6 having a multiplicity of nozzles 10 distributed along its length and envisaged for the projection of a cleaning liquid in the form of a spray, for example water or a mixture of water with other cleaning and maintenance substances, the liquid of which accesses said nozzles through the conventional flexible conduits (not represented in the drawing for the sake of simplicity), impelled by means of a pumping device from a container tank (not represented in the drawing for the sake of simplicity) preferably installed on the tractor vehicle or towed, as is frequently the case with field work.

The telescopic arm is composed of two portions 7, 8, aligned and coupled therebetween, the relative extension of which is determined by a hydraulic cylinder 9 fixed to the upper closing part 5 of the parallelogram by one of its ends, which runs parallel to the arm for the articulated joint of its rod to the distal end of the movable front portion 8 of said extendable arm. In correspondence with said distal end of the movable portion 8 of the arm, the inclusion of structure 11 articulated with the aforementioned projection bar 6 has been envisaged, whereupon a hydraulic cylinder 12 acts, through joint 12b, the change in position of the projection bar 6 in relation to the telescopic arm, wherein the maximum permissible adjustment of the aforementioned bar 6 is susceptible to adjustment in accordance with the inclination angle of the surfaces to be cleaned by means of a spring or safety screw, indicated in FIG. 1 with numerical reference 19, included in the aforementioned articulation structure 11. The said hydraulic cylinder 12 which acts to position the projection bar 6 is disposed in such a manner that it extends longitudinally in the same plane as the telescopic arm and has its proximal end 12a fixed articulately to the movable section 8 of the telescopic arm. As mentioned earlier, the projection bar 6 includes several sensors 13, distributed throughout its length, for controlling the position of the aforementioned bar 6 during cleaning operations in relation to the superficial plane of the module whereto it is applied, for the purpose of preventing physical contact between said bar and the surface of the module that could cause unwanted damages or blemishes to the latter. These mechanical, or contact, sensors are regulated by means of an automated electric system which transmits movement orders to the respective cylinders through an oleo-hydraulic system.

Likewise, the unit includes other actuator cylinders related to other functionalities of the device. Therefore, in combination with the support structure 1, a hydraulic actuator 15 extended between an articulation position 15b at a fixed point in relation to the closing part 3 of the lower end of the parallelogram and a point of articulation 15a with one of the side bars 4 of the parallelogram structure. Extension or retraction of the rod of said hydraulic actuator causes pivoting of the bar 4 whereto it is joined, transmitting this action to the upper part 5 to cause, likewise, pivoting thereof and thus a change in the inclination angle of the telescopic arm in order to adapt the height of the projection bar 6, raising it above the surface of the module to be cleaned (in combination with the action of the cylinder 9); next, the actuation on the cylinder 12 determines and regulates the parallelism between the projection bar 6 and the surface of the module to be cleaned, while the sensors 13 limit the proximity of the projection bar 6 to the surface of the module in order to produce a condition of parallelism therebetween that is more favourable to the cleaning operation to be carried out while avoiding, as mentioned earlier, unwanted physical contact therebetween. With regard to the action of the hydraulic cylinder 18, it shall be understood that the extension/retraction of its rod causes the movement of the rack 17, transmitting this linear movement to the pinion 16 with the ensuing transformation into rotational movement, which rotates the entire unit held up by the structure in relation to the cylinder axis 2.

Figure 2:
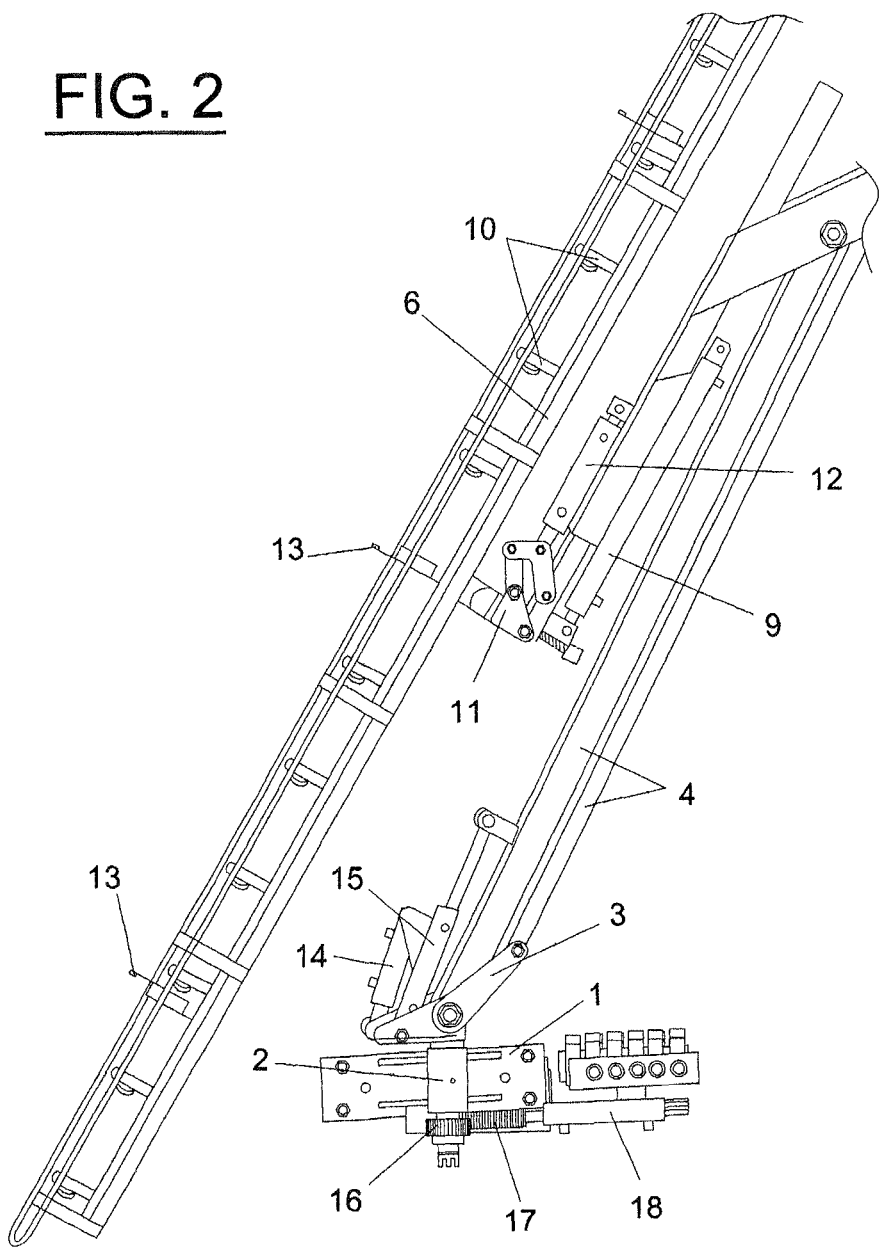
FIG. 2 shows a schematic elevational side view of the device of the invention in its folded position during transport.

For its part, the hydraulic cylinder 14 is, likewise, susceptible of actuation for pivoting the lower closing part 3 of the parallelogram structure towards a variable position of the bars 4 in relation to their verticality. This action is extremely useful to the transportability of the unit as it allows folding thereof, firstly by means of the vertical positioning of the side bars 4 of the parallelogram structure, mutually attached therebetween, and then by means of the equally vertical positioning of the projection bar 6 by actuation of the cylinder 12, inserting the arm 7, 8 between the two elements, also in an upright position, by virtue of the pivoting adopted by the upper part 5 of the parallelogram structure, by transfer of the pivoting of the lower part 3. Therefore, the positions are susceptible of being reached by means of the actuation of the different hydraulic actuation elements. This folding condition for facilitating transport can be observed in greater detail in the representation of FIG. 2.

As it will be understood, with a device such as that described, cleaning operations can be easily, conveniently, quickly and safely carried out given its capacity for movement by means of the tractor vehicle wherein it is incorporated and its capacity for positioning on the modules to be cleaned by virtue of the parallelogram structure included in the device and the articulations between mobile elements that facilitate the positioning of the spray bar 6 with an inclination angle corresponding to that of said modules.

With regard to controlling the different functional elements of the unit, the invention envisages the inclusion of an electroautomatic and oleohydraulic-type system, although it is not described specifically due to being standard in nature, of the type conventionally included in farming and similar machinery.

It is not considered necessary to extend the content of the present description further for a person skilled in the art to understand its scope and the advantages derived therefrom, as well as carrying out the practical embodiment of the object thereof.

Notwithstanding the foregoing and due to the fact that the description made corresponds solely to an example of preferred embodiment, it shall be understood that multiple modifications and variations in detail may be introduced in its essentiality, likewise comprised within the scope of the invention, which may particularly affect characteristics such as the shape, size or manufacturing materials or any others that do not alter the invention as it has been described and as defined in the claims set out below.

The invention claimed is:

1. A device for cleaning photovoltaic and solar thermal panels configured to be towed by a tractor vehicle through a photovoltaic module and solar thermal panel facility for cleaning a surface of modules that house the photovoltaic and solar thermal panels, the modules installed in an orderly and separate manner in power generation plants and solar thermal facilities for leveraging and transforming the solar radiation incident thereupon, the cleaning of which for avoiding opacities that can reduce or hamper a passage of solar radiation, wherein the cleaning operation is carried out by projecting a water-based liquid in the form of spray, including cleaning and maintenance components, impelled from a container tank mounted on the tractor vehicle using pumping means, wherein the device is implemented by an articulated unit held up by a support structure equipped with a plate (1) for fixation to the tractor vehicle, which includes a cylindrical vertical part (2) for housing a shaft solidly joined to a constituent part (3) of a lower closing part of a parallelogram structure which additionally comprises two side bars (4) and an upper part (5), a telescopically extendable arm fixed to the upper part (5), the telescopically extendable arm including a joining portion (7) and a movable front portion (8) that are aligned and mutually coupled therebetween, wherein the movable front portion (8) is movable in relation to the joining portion (7) and includes, at a distal end of the movable front portion (8), an articulation structure (11) to which a projection bar (6) is joined, and wherein the projection bar (6) projects the cleaning liquid towards the surface of the modules through a multiplicity of nozzles (10) distributed along the length of said projection bar (6).

2. The device according to claim 1, wherein the shaft inserted in the cylindrical vertical part (2) of the support structure includes a pinion (16) engaged with a horizontally movable rack (17) solidly joined to a rod of a first cylinder (18), an actuation of which causes rotation of the articulated unit in relation to said shaft.

3. The device according to claim 1, wherein an extension of the movable front portion (8) of the telescopically extendable arm in relation to the joining portion (7) to the upper part (5) of the parallelogram structure is carried out using a second hydraulic cylinder (9) that runs parallel to said telescopically extendable arm.

4. The device according to claim 1, wherein a third hydraulic cylinder (12) extends with articulated joints (12a, 12b) between the movable front portion (8) of the telescopically extendable arm and the articulation structure (11) with the projection bar (6), for the pivoting of said projection bar (6), and wherein a maximum inclination of said projection bar (6) is adjusted by a spring or safety screw (19) included in said articulation structure (11).

5. The device according to claim 1, wherein a fourth hydraulic cylinder (15) is fixed to the support structure (1) and one of the two side bars (4) of the parallelogram structure by respective joints (15b, 15a), an actuation of which determines a variation in an inclination of said two side bars (4) of the parallelogram structure.

6. The device according to claim 1, wherein a fifth hydraulic cylinder (14) is extended between the support structure (1) and the constituent part (3) of the lower closing part the parallelogram structure and fixed by respective articulated joints (14b, 14a), an the actuation of which determines a pivoting of said lower part (3) which is transmitted to the upper part (5) of the parallelogram structure by the two side bars (4), in order to determine variations in a vertical plane of a position of said telescopically extendable arm (7, 8) and of the associated projection bar (6).

7. The device according to claim 1, wherein the projection bar (6) additionally includes sensors (13) which determine a position of the projection bar in relation to the surface of a photovoltaic module to be cleaned, in order to rectify a relative inclination angle of the projection bar towards a more favourable condition of parallelism and avoid unwanted physical contact with said surface.

8. A device for cleaning photovoltaic and solar thermal panels configured to be towed by a tractor vehicle through a photovoltaic module and solar thermal panel facility for cleaning a surface of modules that house the photovoltaic and solar thermal panels, the modules installed in an orderly and separate manner in power generation plants and solar thermal facilities for leveraging and transforming the solar radiation incident thereupon, the cleaning of which for avoiding opacities that can reduce or hamper a passage of solar radiation, wherein the cleaning operation is carried out by projecting a water-based liquid in the form of spray, including cleaning and maintenance components, impelled from a container tank mounted on the tractor vehicle using pumping means, wherein the device is implemented by an articulated unit held up by a support structure equipped with a plate (1) for fixation to the tractor vehicle, which includes a cylindrical vertical part (2) for housing a shaft solidly joined to a constituent part (3) of a lower closing part of a parallelogram structure which additionally comprises two side bars (4) and an upper part (5), a telescopically extendable arm fixed to the upper part (5), the telescopically extendable arm including a joining portion (7) and a movable front portion (8) that are aligned and mutually coupled therebetween, wherein the movable front portion (8) is movable in relation to the joining portion (7) and includes, at a distal end of the movable front portion (8), an articulation structure (11) to which a projection bar (6) is joined, and wherein the projection bar (6) projects the cleaning liquid towards the surface of the modules through a multiplicity of nozzles (10) distributed along the length of said projection bar (6); and wherein the shaft inserted in the cylindrical vertical part (2) of the support structure includes a pinion (16) engaged with a horizontally movable rack (17) solidly joined to a rod of a first cylinder (18), an actuation of which causes rotation of the articulated unit in relation to said shaft.

9. A device for cleaning photovoltaic and solar thermal panels configured to be towed by a tractor vehicle through a photovoltaic module and solar thermal panel facility for cleaning a surface of modules that house the photovoltaic and solar thermal panels, the modules installed in an orderly and separate manner in power generation plants and solar thermal facilities for leveraging and transforming the solar radiation incident thereupon, the cleaning of which for avoiding opacities that can reduce or hamper a passage of solar radiation, wherein the cleaning operation is carried out by projecting a water-based liquid in the form of spray, including cleaning and maintenance components, impelled from a container tank mounted on the tractor vehicle using pumping means, wherein the device is implemented by an articulated unit held up by a support structure equipped with a plate (1) for fixation to the tractor vehicle, which includes a cylindrical vertical part (2) for housing a shaft solidly joined to a constituent part (3) of a lower closing part of a parallelogram structure which additionally comprises two side bars (4) and an upper part (5), a telescopically extendable arm fixed to the upper part (5), the telescopically extendable arm including a joining portion (7) and a movable front portion (8) that are aligned and mutually coupled therebetween, wherein the movable front portion (8) is movable in relation to the joining portion (7) and includes, at a distal end of the movable front portion (8), an articulation structure (11) to which a projection bar (6) is joined, and wherein the projection bar (6) projects the cleaning liquid towards the surface of the modules through a multiplicity of nozzles (10) distributed along the length of said projection bar (6); and wherein a third hydraulic cylinder (12) extends with articulated joints (12a, 12b) between the movable front portion (8) of the telescopically extendable arm and the articulation structure (11) with the projection bar (6), for the pivoting of said projection bar (6), and wherein a maximum inclination of said projection bar (6) is adjusted by a spring or safety screw (19) included in said articulation structure (11).

\* \* \* \* \*